United States Patent
Leventer et al.

(10) Patent No.: US 11,425,110 B2
(45) Date of Patent: Aug. 23, 2022

(54) SECURED TRANSPORT IN REMOTE MAC/PHY DAA ARCHITECTURE

(71) Applicant: Harmonic, Inc., San Jose, CA (US)

(72) Inventors: Amir Leventer, Kfar Saba (IL); Daniel Ginsburg, Tel Aviv (IL)

(73) Assignee: Harmonic, Inc., San Jose, CA (US)

(*) Notice: Subject to any disclaimer, the term of this patent is extended or adjusted under 35 U.S.C. 154(b) by 130 days.

(21) Appl. No.: 17/087,525

(22) Filed: Nov. 2, 2020

(65) Prior Publication Data
US 2021/0136050 A1 May 6, 2021

Related U.S. Application Data

(60) Provisional application No. 62/930,201, filed on Nov. 4, 2019.

(51) Int. Cl.
| | |
|---|---|
| *H04L 9/40* | (2022.01) |
| *H04B 10/27* | (2013.01) |
| *H04L 12/46* | (2006.01) |
| *H04M 7/12* | (2006.01) |
| *H04L 12/28* | (2006.01) |

(52) U.S. Cl.
CPC ......... *H04L 63/0485* (2013.01); *H04B 10/27* (2013.01); *H04L 12/4633* (2013.01); *H04L 63/029* (2013.01); *H04M 7/1215* (2013.01)

(58) Field of Classification Search
CPC ............. H04L 63/0485; H04L 12/4633; H04L 63/029; H04L 12/2859; H04L 63/164; H04L 63/0428; H04B 10/27; H04M 7/1215

See application file for complete search history.

(56) References Cited

U.S. PATENT DOCUMENTS

| | | | |
|---|---|---|---|
| 8,271,775 B2* | 9/2012 | Shenoy | H04L 63/162 713/168 |
| 2002/0129271 A1* | 9/2002 | Stanaway, Jr. | H04L 63/0272 713/150 |
| 2002/0163920 A1* | 11/2002 | Walker | H04L 63/0227 370/469 |
| 2008/0126559 A1* | 5/2008 | Elzur | H04L 63/0464 709/232 |
| 2015/0092531 A1* | 4/2015 | Bernstein | H04L 12/4633 370/254 |
| 2016/0248600 A1* | 8/2016 | Bernstein | H04L 41/0816 |
| 2017/0244577 A1* | 8/2017 | Patrick | H04L 12/4641 |

(Continued)

*Primary Examiner* — Darren B Schwartz
(74) *Attorney, Agent, or Firm* — Brokaw Patent Law PC; Christopher J. Brokaw

(57) ABSTRACT

Exchanging encrypted packet payloads between a cable headend and a Remote MACPHY device. A single device executes a cable modem termination system (CMTS) implemented in software and not hardware. The software-implemented CMTS (i.e., a virtual CMTS) instantiates a tunnel to the Remote MACPHY device. The virtual CMTS encrypts the payloads of one or more packets and transmits those packets over the tunnel to the Remote MACPHY device. In similar fashion, the Remote MACPHY device may send packets with encrypted payloads to the virtual CMTS over the tunnel. In this way, encryption is not performed on a hop by hop basis, thereby allowing the payloads of packets to remain encrypted at all times during transmit through the tunnel.

12 Claims, 5 Drawing Sheets

(56) References Cited

U.S. PATENT DOCUMENTS

2017/0331794 A1* 11/2017 Lokman ................ H04L 63/164
2019/0327205 A1* 10/2019 Saidumuhamed .. H04L 12/4641
2021/0099231 A1*  4/2021 Schaefer ............ H04Q 11/0067

* cited by examiner

SECURED TRANSPORT IN REMOTE MAC/PHY DAA ARCHITECTURE

CLAIM OF PRIORITY

This application claims priority to U.S. Provisional Patent Application Ser. No. 62/930,201, filed Nov. 4, 2019, entitled "Secured Transport in Remote MAC PHY DAA Architecture," the entire contents of which are hereby incorporated by reference for all purposes as if fully set forth herein.

FIELD OF THE INVENTION

Embodiments of the invention relate to the exchange of packets between a cable headend and a Remote MACPHY device.

BACKGROUND

A Converged Cable Access Platform (CCAP) is an industry standard platform for transmitting video data and voice content. The CCAP is led by CableLabs of Louisville, Colo. CableLabs has publicly issued a Remote PHY family of specifications, known as the Modular Headend Architecture version 2 (MHAv2) specifications. These specifications describe how a CCAP platform may be separated into two components, (1) a CCAP Core located at a cable headend, and (2) a Remote PHY device (RPD), which is typically located outdoors. A RPD may be located, for example, at the junction of the fiber and coax plants in an optical node serving as a Remote PHY Node (RPN). A CCAP core can control and setup data paths with multiple RPDs situated in multiple fiber nodes. FIG. 1 is a block diagram of a CCAP platform which includes an RPD situated inside an RPN in accordance with the MHAv2 specifications of the prior art.

CableLabs has also issued a technical report about the R-MACPHY architecture and is currently undertaking an effort to formalize a specification for R-MACPHY products, specifically a Remote MACPHY Device (RMD) which resides in a Remote MACPHY node (RMN). This technical report describes Remote MACPHY (or MAC-PHY) as a generic term given to the distributed CMTS/CCAP architecture where the DOCSIS MAC and PHY layer processing of a CMTS are moved from the headend down to a Fiber Node location.

An access network is a network that connects subscribers to a particular service provider and, through the carrier network, to other networks such as the Internet. Modern access networks are becoming a decentralized subset of the functionality as certain functions that previously were performed centrally are moved to locations closer to subscribers. This trend is exhibited in the cable industry by a Distributed Access Architecture (DAA) Cable Network, which is a decentralizing cable network that relocates functions that have typically resided in the headend or hub to the fiber nodes that physically reside closer to the subscriber. Examples of functions that have been relocated include distributing Layer 1 functionality to Remote PHY devices and distributing Layer 1 functionality and some Layer 2 functionality to a Remote MACPHY node.

Because Remote PHY devices and Remote MACPHY devices are deployed outdoors in unsecured environments, data transmitted from the cable headend to Remote PHY devices and Remote MACPHY devices is encrypted for security concerns as mandated by the MHAv2 specifications. FIG. 2 is an illustration of how data transmitted from a cable headend to Remote PHY devices has been encrypted per the present state of the art. FIG. 2 shows that User Frames that are transmitted from a virtualized core to a Remote PHY device over the transport network are encrypted using a subscriber encryption. The subscriber encryption is performed by the MAC layer.

In the context of Remote MACPHY devices, the MAC layer is implemented at the remote device, whereas the MAC layer is implemented at the headend with Remote PHY devices. For this reason, the same approach used by Remote PHY device depicted by FIG. 2 cannot be used with Remote MACPHY devices. FIG. 3 is an illustration of how data transmitted from a cable headend to Remote MACPHY devices has been performed per the present state of the art. Unfortunately, as shown by FIG. 3, User Frames that are exchanged between a virtualized core and a Remote MACPHY device over the Transport Network are not encrypted. This exposes those User Frames to a certain amount of risk during transit, as the Transport Network often traverses unsecured areas which may be accessed by malicious parties for purposes of affecting an unauthorized tap of the data carried by the Transport Network.

To address this concern, point to point (P2P) encryption is presently used on each hop for traffic involving a Remote MACPHY device. The encryption is typically carried out using MACSec encryption protocol, which is defined by IEEE standard 802.1AE. This approach unfortunately requires traffic to not only be encrypted hop by hop, but also decrypted hop by hop; as a result, if traffic were to be maliciously tapped at any intermediate node between the headend and the subscriber, the traffic could be accessed in an unencrypted form since traffic is only in an encrypted form when the traffic is in transmit over a link between nodes. As nodes in the cable network are often deployed in unsecured areas, this is an unaddressed risk to cable operators in the present state of the art.

Additionally, this manner of point to point (P2P) encryption for Remote MACPHY device traffic is only possible for certain types of equipment, as certain legacy equipment does not possess the capabilities to encrypted all traffic in transit over a link in this fashion. Therefore, cable operators are often required to make a costly investment in equipment upgrades to employ point to point (P2P) encryption for traffic in transit between nodes of the cable network.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for exchanging encrypted packet payloads between a cable headend and a Remote MACPHY device are presented herein. In the following description, for the purposes of explanation, numerous specific details are set forth to provide a thorough understanding of the embodiments of the invention described herein. It will be apparent, however, that the embodiments of the invention described herein may be practiced without these specific details. In other instances, well-known structures and devices are shown in block diagram form or discussed at a high level to avoid unnecessarily obscuring teachings of embodiments of the invention.

Figure 1:
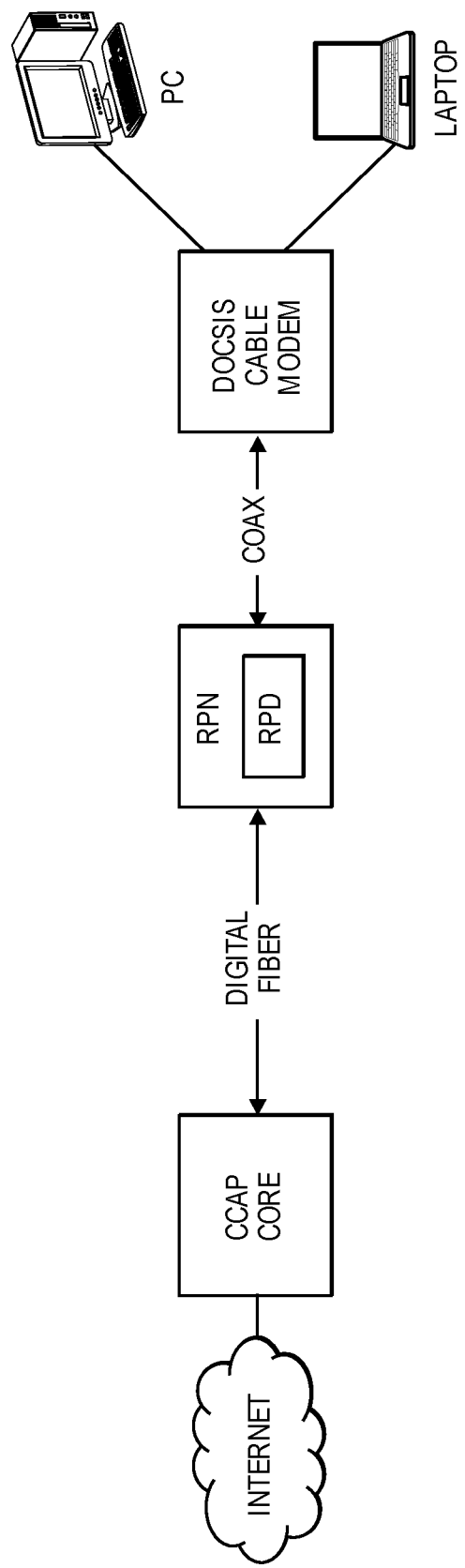
FIG. 1 is a block diagram of a CCAP platform which includes an RPD situated inside an RPN in accordance with the MHAv2 specifications of the prior art (see P211)
Figure 2:
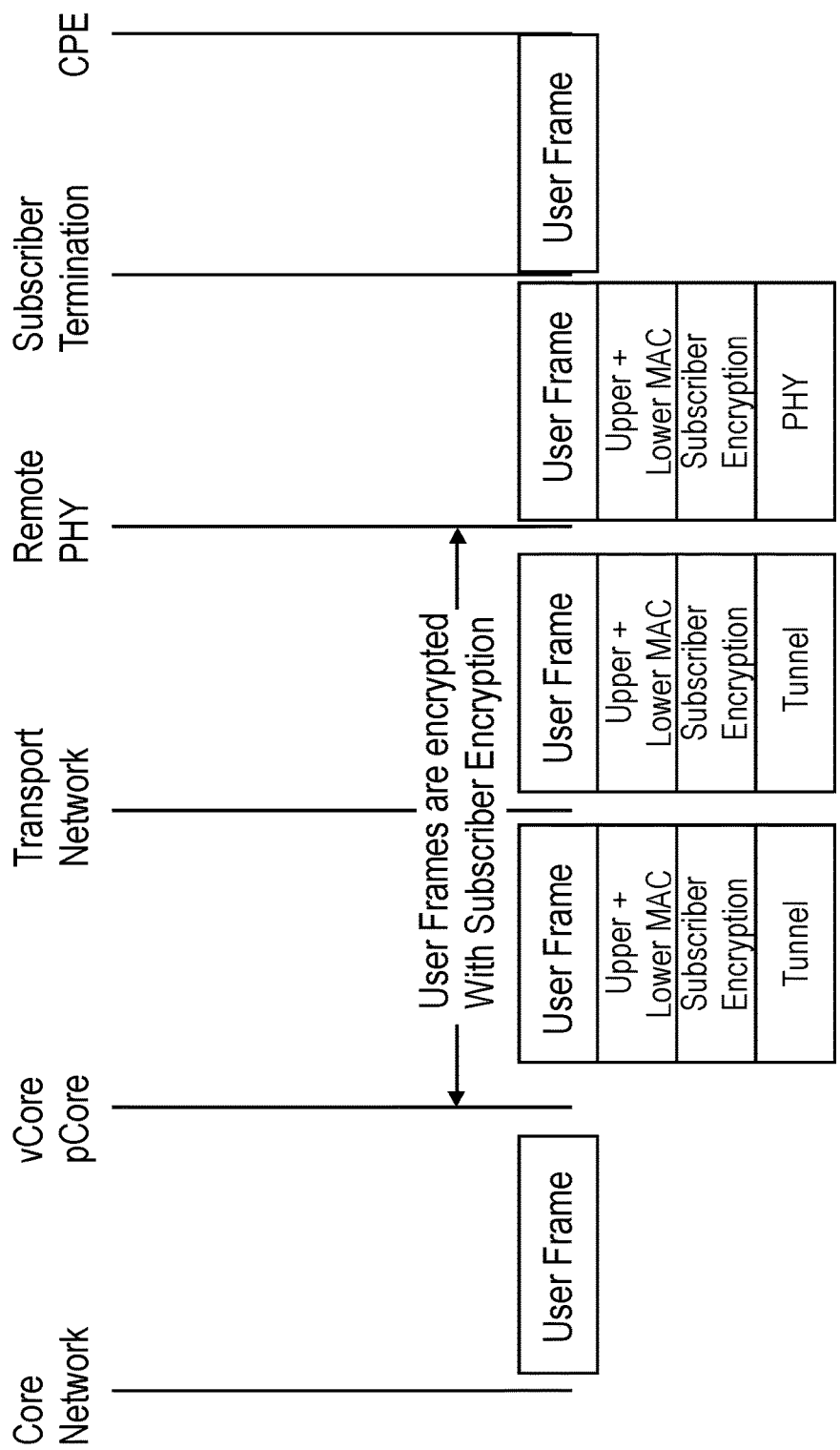
FIG. 2 is an illustration of how data transmitted from a cable headend to Remote PHY devices has been encrypted per the present state of the art.
Figure 3:
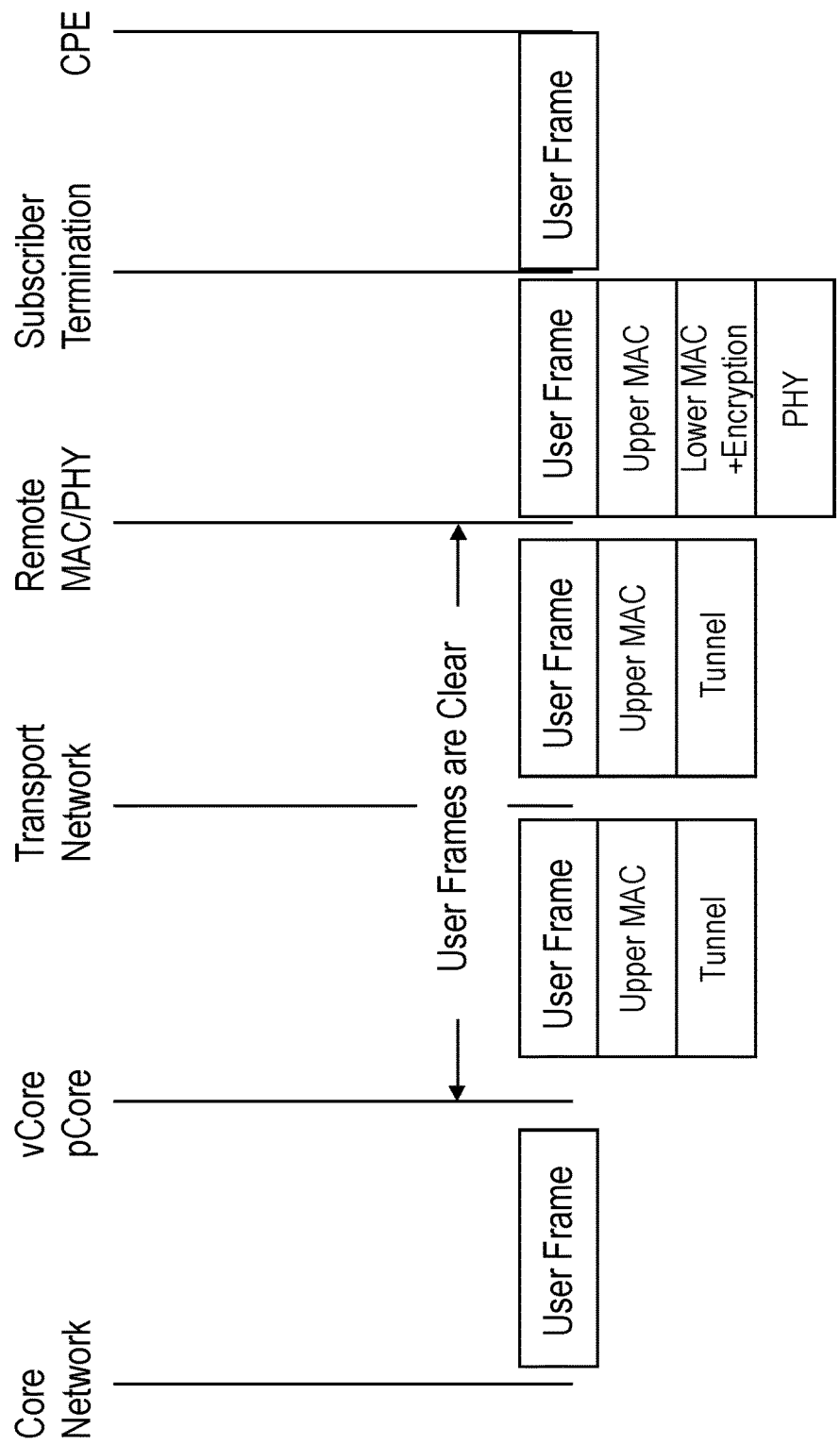
FIG. 3 is an illustration of how data transmitted from a cable headend to Remote MACPHY devices has been performed per the present state of the art.
Figure 4:
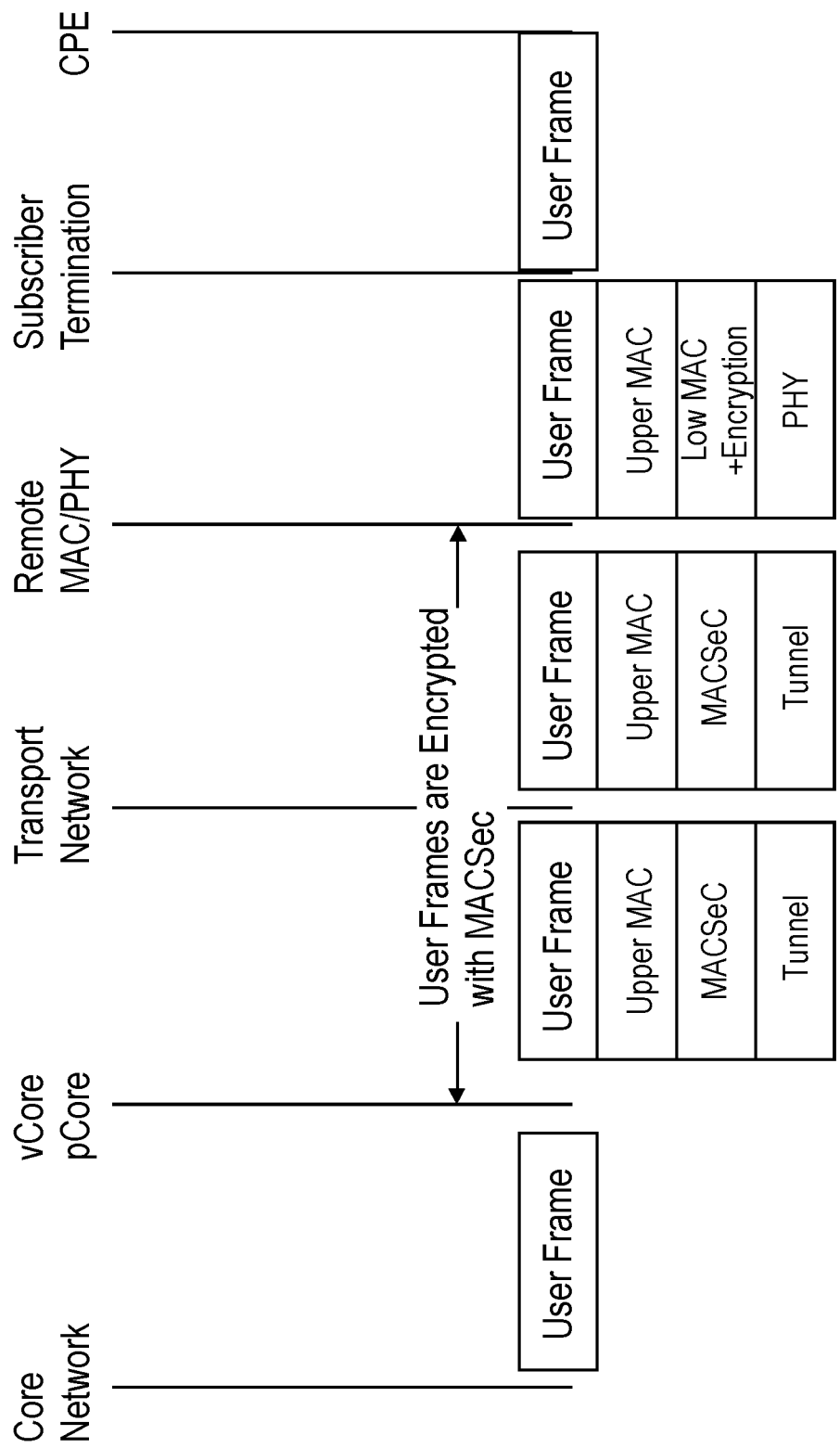
FIG. 4 is an illustration of how encrypted data is transmitted from a cable headend to Remote MACPHY device using a tunnel in accordance with an embodiment of the invention.

FIG. 4 is an illustration of an approach for exchanging encrypted data between a cable headend and a Remote MACPHY device using a tunnel in accordance with an embodiment of the invention. FIG. 4 depicts a sequence of entities, from a Core Network, a virtual CMTS (represented by vCore or pCore, which corresponds to a software implemented CMTS that executes upon a hardware computer system), a Transport Network, a particular Remote MACPHY device, a Subscriber Termination device (such as a Cable Modem), and Customer Premises Equipment (CPE). The Core Network and the virtual CMTS depicted in FIG. 4 will reside at the cable headend, whereas the Subscriber Termination device and the CPE will generally reside at the subscriber abode.

As shown by FIG. 4, embodiments of the invention may employ a virtual CMTS that instantiates a tunnel to a particular Remote MACPHY device. The virtual CMTS may then encrypt packets using an encryption protocol, such as but not limited to MAC Sec encryption, and send packets to the particular Remote MACPHY device over the tunnel. The Remote MACPHY device may, in turn, transmit encrypted packets to the virtual CMTS over the tunnel. In FIG. 4, the term Upper MAC refers to the part of the MAC that interacts with the Logical Link Control (LLC) sub-layer, while the term lower MAC refers to a part in the MAC that interacts with PHY layer.

While only one Remote MACPHY device is represented by FIG. 4, in practice the virtual CMTS may establish a plurality of tunnels, each of which terminates at a different Remote MACPHY device. In this way, the virtual CMTS may communicate securely with a multiple of Remote MACPHY devices.

In an embodiment, the tunnel may be a Layer 3 tunnel. The outer encapsulation of the tunnel may be Layer 3, while the payload is Layer 2. Non-limiting, illustrative examples of protocols that may be used to establish a tunnel include the Virtual Extensible LAN (VXLAN) protocol and the Layer 2 Tunneling Protocol Version 3 (L2TPv3). VXLAN or L2TPv3 may establish the tunnel using IP packets (and thus, correspond to Layer 3). Such IP packets may be routed just like any other IP packet, but inside each of these IP packet is an Ethernet frame (i.e., a Layer 2 construct). Thus, Ethernet frames may be exchanged over the tunnel similar to how Ethernet frames over conveyed over a bare physical link. In this sense, the tunnel can be though of as a virtual wire.

The encryption that is performed to the tunnel packet is applied only to the payload and not to the entire tunnel packet. As a result, this leaves the IP header of the tunnel packet unencrypted. As the IP header of the tunnel packet remains readable in an unencrypted format, the tunnel packet may be easily routed as it travels through the tunnel established by the virtual CMTS.

Because the tunnel extends from the virtual CMTS to a particular Remote MACPHY device, encryption is not performed on a hop by hop basis. Thus, the payload of the tunnel packet remains encrypted at all times during transmit through any intermediate node during transmit through the tunnel. As the payload of the tunnel packet remains encrypted during transit, any malicious party who taps the transport network is prevented from accessing to the unencrypted version of the payload of those tunnel packets.

In an embodiment, a Remote MACPHY device may correspond to an OLT element in a PON. A Remote MACPHY device may transit encrypted Data Over Cable Service Interface Specification (DOC SIS) data over the transport network shown in FIG. 5. In another embodiment, a Remote MACPHY device of an embodiment may reside on a 4G Radio Access Network (RAN) network or a fifth generation (5G) broadband cellular network. A RAN is a portion of a telecommunications system that connects separate devices to other network locations using radio connections.

Figure 5:
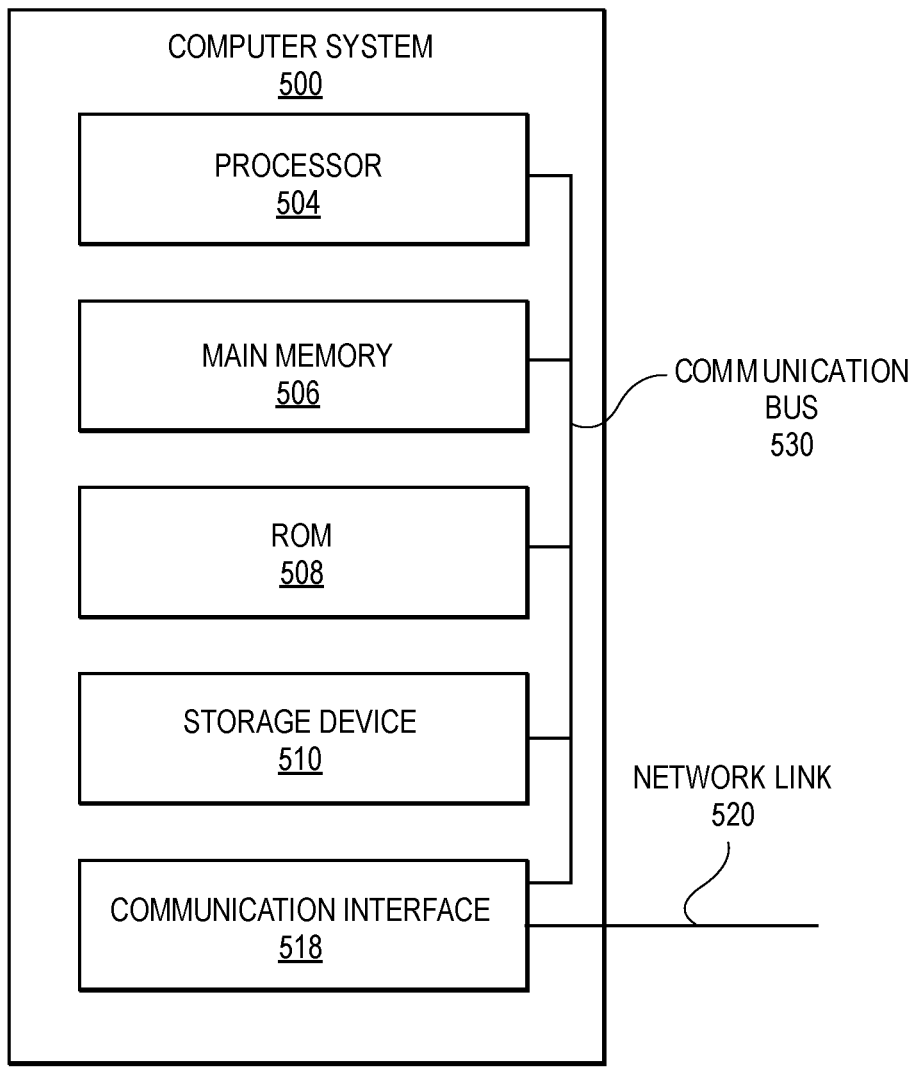
FIG. 5 is a block diagram that illustrates a computer system upon which components of a Cable Modem Termination System (CMTS), cable node, or Remote MACPHY device may be implemented.

FIG. 5 is a block diagram that illustrates a computer system 500 upon which physical components of cable broadband service network, such as a virtual CMTS or a Remote MACPHY device, may be implemented. Computer system 500 may correspond to either Commercial-Off-The-Shelf (COTS) computer hardware or special-purpose hardware.

In an embodiment, computer system 500 includes processor 504, main memory 506, ROM 508, storage device 510, and communication interface 518. Computer system 500 includes at least one processor 504 for processing information. Computer system 500 also includes a main memory 506, such as a random-access memory (RAM) or other dynamic storage device, for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device for storing static information and instructions for processor 504. A storage device 510, such as a magnetic disk or optical disk, is provided for storing information and instructions.

Embodiments of the invention are related to the use of computer system 500 for implementing the techniques described herein. According to one embodiment of the invention, computer system 500 may perform any of the actions described herein in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any non-transitory tangible medium that participates in storing instructions which may be provided to processor 504 for execution. Note that transitory signals are not included within the scope of a non-transitory machine-readable storage medium. A non-transitory machine-readable storage medium may take many forms, including but not limited to, non-volatile media and volatile media. Non-volatile media includes, for example, optical or magnetic disks, such as storage device 510. Volatile media includes dynamic memory, such as main memory 506.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a network link 520 to computer system 500.

Communication interface 518 provides a two-way data communication coupling to a network link 520 that is connected to a local network. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through a local network to a host computer or to data equipment operated by an Internet Service Provider (ISP).

Computer system 500 can send messages and receive data, including program code, through the network(s), network link 520 and communication interface 518. For example, a server might transmit a requested code for an application program through the Internet, a local ISP, a local network, subsequently to communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent modification. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums storing one or more sequences of instructions for exchanging encrypted packet payloads between a cable headend and a Remote MACPHY device, which when executed, cause:

instantiating, from a single device executing a virtual cable modem termination system (CTMS) implemented in software and not hardware, a Layer 3 tunnel to said Remote MACPHY device;

the virtual CMTS encrypting a payload of the packet and transmitting the packet with the encrypted payload over the Layer 3 tunnel to said Remote MACPHY device; and the virtual CMTS receiving, from said Remote MACPHY device, one or more packets over said Layer 3 tunnel, wherein said one or more packets each comprise payloads encrypted with subscriber encryption that were not decrypted at any point during transmit over said Layer 3 tunnel.

2. The one or more non-transitory computer-readable storage mediums of claim 1, wherein said Remote MACPHY device is an Optical Line Terminal (OLT) element in a Passive Optical Network (PON).

3. The one or more non-transitory computer-readable storage mediums of claim 1, wherein said Remote MACPHY device is in a 4G Radio Access Network (RAN) network or a 5G broadband cellular network.

4. The one or more non-transitory computer-readable storage mediums of claim 1, wherein the single device is a Commercial-Off-the-Shelf (COTS) computer.

5. A system for exchanging encrypted packet payloads between a cable headend and a Remote MACPHY device, comprising:

one or more processors; and one or more non-transitory computer-readable storage mediums storing one or more sequences of instructions, which when executed, cause:

instantiating, from a single device executing a virtual cable modem termination system (CTMS) implemented in software and not hardware, a Layer 3 tunnel to said Remote MACPHY device;

the virtual CMTS encrypting a payload of the packet and transmitting the packet with the encrypted payload over the Layer 3 tunnel to said Remote MACPHY device; and the virtual CMTS receiving, from said Remote MACPHY device, one or more packets over said Layer 3 tunnel, wherein said one or more packets each comprise payloads encrypted with subscriber encryption that were not decrypted at any point during transmit over said Layer 3 tunnel.

6. The system of claim 5, wherein said Remote MACPHY device is an Optical Line Terminal (OLT) element in a Passive Optical Network (PON).

7. The system of claim 5, wherein said Remote MACPHY device is in a 4G Radio Access Network (RAN) network or a 5G broadband cellular network.

8. The system of claim 5, wherein the single device is a Commercial-Off-the-Shelf (COTS) computer.

9. A method for exchanging encrypted packet payloads between a cable headend and a Remote MACPHY device, comprising:

instantiating, from a single device executing a virtual cable modem termination system (CTMS) implemented in software and not hardware, a Layer 3 tunnel to said Remote MACPHY device;

the virtual CMTS encrypting a payload of the packet and transmitting the packet with the encrypted payload over the Layer 3 tunnel to said Remote MACPHY device; and the virtual CMTS receiving, from said Remote MACPHY device, one or more packets over said Layer 3 tunnel, wherein said one or more packets each comprise payloads encrypted with subscriber encryption that were not decrypted at any point during transmit over said Layer 3 tunnel.

10. The method of claim 9, wherein said Remote MAC-PHY device is an Optical Line Terminal (OLT) element in a Passive Optical Network (PON).

11. The method of claim 9, wherein said Remote MAC-PHY device is in a 4G Radio Access Network (RAN) network or a 5G broadband cellular network.

12. The method of claim 9, wherein the single device is a Commercial-Off-the-Shelf (COTS) computer.

* * * * *